2,877,056

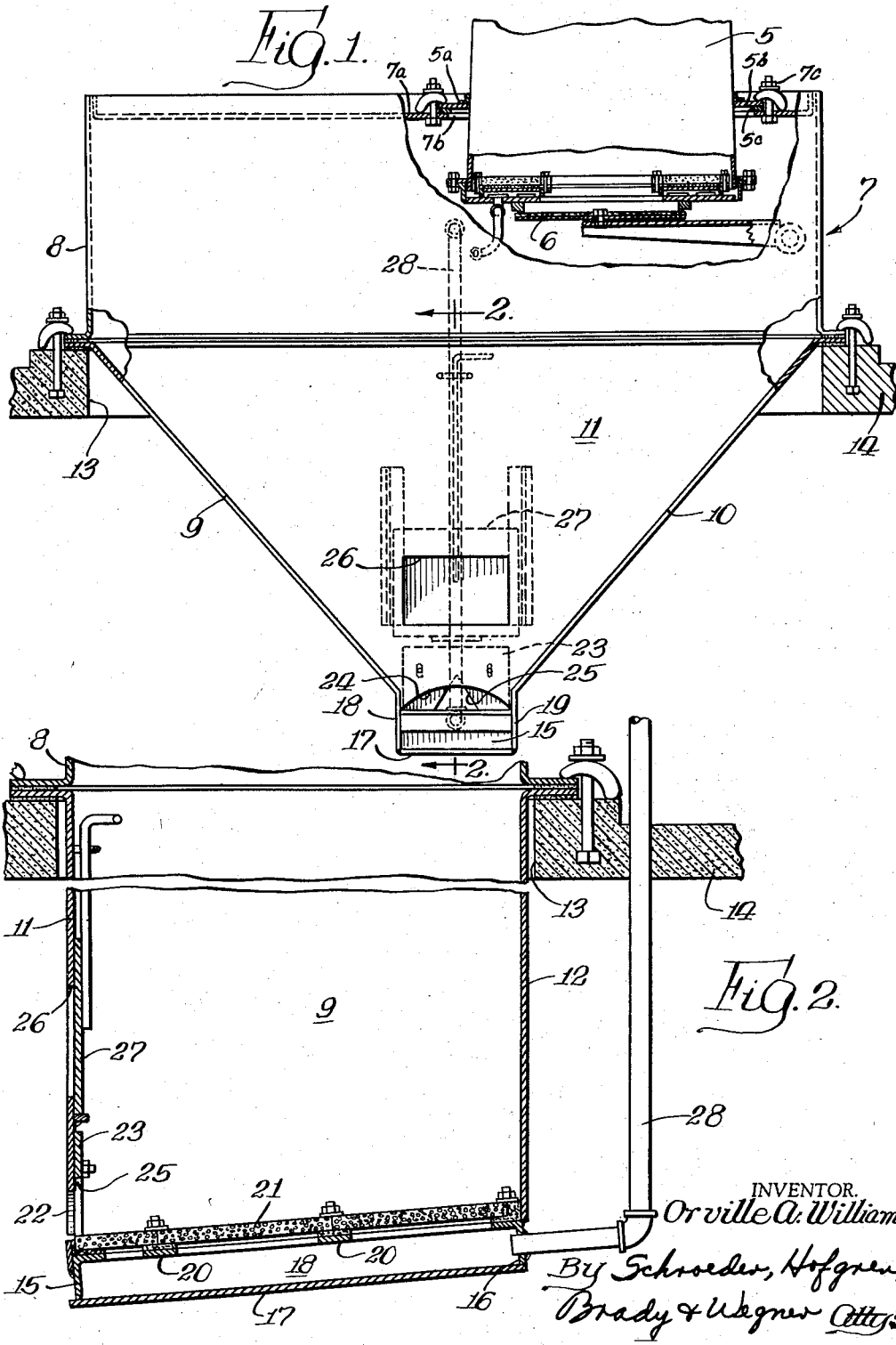

METHOD OF AND APPARATUS FOR FEEDING HOT PULVERULENT MATERIAL TO A STORAGE BIN

Orville A. Williams, Mount Prospect, Ill., assignor to United Conveyor Corporation, a corporation of Illinois Application March 13, 1957, Serial No. 645,716

6 Claims. (Cl. 302—53)

This invention relates to a method of and apparatus for feeding hot pulverulent material from a vacuum conveyor collector to a storage bin, and in particular it relates to a method and apparatus by means of which a drop of material from the collector flows into the bin much more slowly than it is released from the collector.

Large coal burning furnaces, such as those used in power plants, produce an immense quantity of very fine ash which is usually handled in a vacuum conveyor system which loads it into a storage bin. This requires a receiver in the vacuum system in which the ash is collected, and from which it is periodically released to the storage bin by opening a dump gate. The ash is hot when it is dropped into the bin, and since it is very fine its contained heat is rapidly imparted to the air in the storage bin, producing a rapid expansion of the air in the bin which may build up dangerous pressure if the air is not vented through a large vent of low resistance.

However, such a vent releases objectionable amounts of dust to the atmosphere and to prevent this a filter must be used on the vent. If the size of the filtered vent is kept within economic limits it is incapable of venting the air from the bin fast enough to prevent dangerous air pressures from developing which can be of explosive force. There have been cases in which the rapid heating of the air by a large dump of ash produced an explosive phenomenon of sufficient force to lift a five ton roof several inches off the top of a bin and shift it several degrees before it was set down again. The present invention eliminates the sudden heating of air in the bin, and thus eliminates the dangerous condition which existed each time a fresh dump of hot ash was released to the bin.

In accordance with the present invention, a closed intermediate receiving hopper is positioned between the vacuum conveyor receiver and the storage bin. This intermediate hopper serves to level out the flow of material between the vacuum system receiver and the bin; and in order to do so it is provided with a slightly inclined fluidizing floor by means of which air under pressure may be introduced in a diffused state into the ash in the hopper so as to fluidize the ash and permit it to flow through a small discharge orifice in one wall of the hopper. A porous bottom wall of the hopper and the air chamber beneath it which permits the introduction of diffused air under pressure to the ash in the hopper are of the well-known type commonly used in the handling of extremely fine pulverulent material such as ash, cement, and flour.

In accordance with the present method, individual increments of ash are released from the vacuum conveyor receiver into the hopper, and the hopper acts to release each increment to the storage container relatively slowly so as to prevent any possibility of large surges of material into the container such as could cause a serious hot air blast.

The invention is illustrated in a preferred embodiment in the accompanying drawings, in which:

Fig. 1 is a generally schematic side elevational view of a system embodying the invention, partially in section; and Fig. 2 is a section taken as indicated along the line 2—2 of Fig. 1.

Referring to the drawings in greater detail, as seen in Fig. 1, a vacuum conveyor receiver 5 is provided with a power controlled gate 6 by means of which increments of material may be dumped into a feed hopper, indicated generally at 7.

The conveyor receiver 5 is part of a vacuum conveyor system of conventional construction, and though only one receiver is shown in the drawings, it is obvious that a second receiver might be used to take ash which escapes the primary receiver 5, and would be positioned to the left of the receiver 5.

The hopper 7 has a rectangular upper side wall 8 affording a chamber for dump gate 6, and beneath the wall 8 are inclined side walls 9 and 10 and upright front and rear walls 11 and 12, respectively. The hopper is suitably supported in an opening 13 in the concrete roof 14 of a storage bin. The storage bin may be provided with a conventional bag filter (not shown).

As seen in Fig. 1, hopper 7 has a closure 7a with an opening 7b through which the lower portion of receiver 5 projects. A peripheral mounting flange 5a on the receiver rests on a support ring 5b, and the outer margin of said ring is clamped against a gasket 5c surrounding the margin of opening 7b by clamp bolt means 7c. Thus, the hopper is entirely closed so as to provide a zone which is effectively segregated from the ambient air, the only opening being into the storage bin, which in turn may have a bag filter opening to the atmosphere.

As best seen in Fig. 2, the bottom of the hopper has front and rear channel members, 15 and 16, respectively, a bottom closure 17 and side closures 18 and 19 which form an air compartment having transverse support brackets 20 upon which are mounted porous stone elements forming an aerating bottom 21 for the hopper. The bottom 21 is inclined slightly from the rear wall 12 toward the front wall 11, and an opening 22 in the front wall 11 of the hopper is provided with a flow control plate 23 having an arcuate lower margin 24 which is so designed as to provide an ash outlet opening 25 which can pass no more than a predetermined volume of ash in a given period of time. Above the ash discharge opening 22 in the front wall 11 is a clean-out opening 26 which is closed by a manually movable gate 27.

Extending into the air chamber beneath the porous stone floor 21 of the hopper is an air inlet pipe 28 by means of which air under pressure may be introduced into said compartment so as to flow in a diffused manner through the porous stone 21 to fluidize any ash which is in the bottom of the hopper.

In practicing the method of the present invention, the dump gate 6 of the ash receiver 5 is opened periodically to release successive increments of hot ash from the receiver 5 to the hopper 7, where it falls onto the porous stone bottom 21 of the hopper; so that the bottom portion provides a collecting and aerating zone. Aerating the material in the bottom of the hopper permits it to flow freely toward the outlet opening 25, so that each successive increment may pass into the storage bin in a controlled flow at a relatively slow rate. Thus, instead of dumping an increment into the bin in a few seconds the feed of the increment to the bin may occupy twenty to thirty seconds, which is slow enough to avoid explosive heating of the air in the bin.

The foregoing detailed description is given for clearness of understanding only and no unnecessary limitations are to be understood therefrom, as variations will be obvious to those skilled in the art.

I claim:

1. The method of feeding hot, pulverulent material from a vecuum conveyor system into a storage bin having a restricted, filtered vent which includes the steps of: establishing an intermediate aerating zone and effectively segregating said zone from the ambient air; cyclically releasing successive increments of hot, pulverulent material from the vacuum conveyor system into said intermediate aerating zone; aerating the material in said zone to fluidize it; and feeding the fluidized material from said zone into a storage bin at a relatively slow rate.

2. The method of feeding hot, pulverulent material from a vacuum conveyor system into a storage bin having a restricted, filtered vent which includes the steps of: establishing an intermediate aerating zone and effectively segregating said zone from the ambient air; cyclically releasing successive increments of hot, pulverulent material from the vacuum conveyor system into said intermediate aerating zone; aerating the material in said zone to fluidize it; feeding the fluidized material from said zone into a storage bin at a relatively slow rate; and coordinating the rate of feed material from the aerating zone with the rate of release of material to said zone so that the total amount of material in the zone remains below a predetermined maximum.

3. Mechanism for feeding hot, pulverulent material from a vacuum conveyor system into a storage bin having a restricted, filtered vent, said mechanism comprising: a receiver for hot pulverulent material from the conveyor system; an intermediate material hopper which is efffectively segregated from the ambient air; means for releasing increments of material cyclically from the receiver to said hopper; means for aerating material in the bottom of the hopper to fluidize it; and a relatively small discharge orifice of predetermined size in a wall of the hopper through which said fluidized material may flow at a relatively slow rate directly into the storage bin.

4. Mechanism for feeding hot, pulverulent material from a vacuum conveyor system into a storage bin having a restricted, filtered vent, said mechanism comprising: a receiver for hot pulverulent material from the conveyor system; an intermediate material hopper which is effectively segregated from the ambient air; means for releasing increments of material cyclically from the receiver to said hopper; means for aerating material in the bottom of the hopper to fluidize it; a relatively small discharge orifice of predetermined size in a wall of the hopper through which said fluidized material may flow in a steady stream directly into the storage bin, the size of said discharge orifice being so related to the size and frequency of the increments released from the receiver that the total amount of material in the hopper remains below a predetermined maximum.

5. The method of feeding hot, pulverulent material from a vecuum conveyor system into a storage bin having a restricted filtered vent which includes the steps of: establishing an intermediate collecting zone and effectively segregating said zone from the ambient air; cyclically releasing successive increments of hot, pulverulent material from the vacuum conveyor system into said intermediate collecting zone; and feeding said material from the collecting zone into a storage bin at a relatively slow rate.

6. Mechanism for feeding hot, pulverulent material from a vacuum conveyor system into a storage bin having a restricted filtered vent, said mechanism comprising: a receiver for hot pulverulent material from the conveyor system; an intermediate material hopper which is effectively segregated from the ambient air; means for releasing increments of material cyclically from the receiver to said hopper; a relatively small discharge orifice of predetermined size in a wall of the hopper, said orifice affording a passage through which material may pass from the hopper into a storage bin; and means for feeding material at a relatively slow rate from the hopper through said orifice into the storage bin.

References Cited in the file of this patent

UNITED STATES PATENTS

| | | |
|---|---|---|
| 2,742,328 | Sylvest | Apr. 17, 1956 |
| 2,746,807 | Tolman | May 22, 1956 |
| 2,802,698 | Krauss | Aug. 13, 1957 |